United States Patent [19]
Collins

[11] Patent Number: 5,983,563
[45] Date of Patent: Nov. 16, 1999

[54] ARTIFICIAL WATER CYCLE SYSTEM

[76] Inventor: Olin L. Collins, 8746 Flicker Rd., Tallahassee, Fla. 32310

[21] Appl. No.: 08/697,576

[22] Filed: Aug. 27, 1996

Related U.S. Application Data

[63] Continuation-in-part of application No. 08/570,897, Dec. 12, 1995, abandoned.

[51] Int. Cl.[6] .................................................. A01G 31/00
[52] U.S. Cl. ................................................. 47/62; 405/36
[58] Field of Search ........................ 47/62, 1.01; 405/36, 405/37

[56] References Cited

U.S. PATENT DOCUMENTS 5,383,744  1/1995  Hendershot ................................ 405/36
5,584,602  12/1996  Bevil ........................................ 405/36
5,624,204  4/1997  Dorsemaine ............................... 405/36

*Primary Examiner*—Michael J. Carone
*Assistant Examiner*—Joanne C. Downs
*Attorney, Agent, or Firm*—Peter Loffler

[57] ABSTRACT

An artificial water cycle system is comprised of one or more water table cells or beds, having a generally horizontally disposed base and one or more generally vertically disposed sidewalls each having an end portion and made from a water impervious material, that are submerged below the surface of the soil. The end portion, that form the outer periphery terminate just below the surface while internal end portions terminate several inches below the surface and overlap adjoining internal end portions. The system allows introduced water to percolate down to the base to form an artificial water table and, through capilarity action, to be pulled upward along with nutrients, to supply the plants within the system. Excess water is discharged from the system through capilarity action.

2 Claims, 2 Drawing Sheets

ARTIFICIAL WATER CYCLE SYSTEM

This application is a Continuation-in-Part of U.S. patent application Ser. No. 08/570,897, filed Dec. 12, 1995 now abandoned.

BACKGROUND OF THE INVENTION

1. Field of the Invention

The present invention relates to a device for creating a subterranean artificial water cycle.

2. Background of the Prior Art

Since the beginning of man's agricultural practices, the main problem was always maintaining adequate water supply in order to provide moisture for harvestable and grazing crops. Man was, and in many situations continues to be, dependent on nature for the provision of this life-giving water supply. However, one of the most predictable aspects of nature's gift of atmospherically supplied water, is that nature is unpredictable.

In order t o combat nature's unpredictability, man has devised methods of using terreanean and subterranean methods of water retrieval for crop irrigation. Such methods include irrigation piping, river diversion, artificial lake creation, well digging and others. While such methods have varying degrees of effectiveness, they tend to be expensive to create and operate. This is specially so in desert areas where the natural water table may be up to a hundred feet or more below the surface and any water introduced will quickly dissipate down to the water table depriving any crop the ability to absorb the introduced water. As a result, vast quantities of water must be introduced in order to make an effective system.

Therefore, there is a need in the art for a device that will maximize the effectiveness of an irrigation system for crops. Such a system must maintain any water introduced to the crop, whether naturally or through artificial irrigation, in effective contact with the crops utilizing the system. Such a device must make provisions for channeling away excess waters. Ideally such a device must be of a low cost relative to standard irrigation systems.

SUMMARY OF THE INVENTION

The artificial water cycle of the present invention addresses the aforementioned needs in the art. The device permits water introduced into a crop zone to "hover" at the proper area of the root zone of the crops. Additionally, water soluble materials, such as fertilizer and natural nutrients, will also be maintained at the root zone thereby increasing the nutrient level available to the crop.

The artificial water cycle system of the present invention is comprised of one or more water table cells or beds that are submerged below the surface of the soil. Each bed, which is made from a water impervious material, such as polyethylene, has a base member that is disposed in generally horizontal orientation relative to the surface and has encompassing sidewalls oriented upwardly. The sidewalls that form the outer periphery of the system terminate just below the surface while internal sidewalls terminate relatively further below the surface. The internal sidewalls of each bed face another internal sidewall of another bed and the sidewalls are in spaced apart orientation and each having an open end portion that overlaps one another. The depth of the base member is soil and crop dependent. The further the depth of the base member, the greater the amount of water retained therein and thus the greater the artificial water table established.

Any water introduced onto the soil's surface percolates downward until it reaches the base member which prohibits further downward percolation. As a result, an artificial water table is formed within the bed. Upon reaching the resting point of fully saturated soil, the cohesive force of capilarity act on and cause the water table to release water and pull it, along with contained nutrients upward by mass action. As a result, the crop's roots have a continual supply of water and nutrition. Any introduced water, either natural or through irrigation, is maintained within the system and is utilized by the crops. This greatly reduces the amount of water introduction needed via irrigation means, thereby reducing the costs of agricultural operations.

If excessive water is introduced, such as through a flood, openings existing between the overlapping interior end portions of the beds, as well as the gap between the outer periphery end portions and the soil surface, channel the excessive water, through capilarity action, down toward the natural water table and away from the system.

The system is relatively straightforward to construct and operate. Once installed, the device is virtually maintenance free, requiring the farmer to maintain standard water and nutrition management practices in light of the system. The system has the added benefit in that any contaminants such as pesticides or heavy metals are trapped by the base member and are not permitted to percolate to the natural water table. Such elements tend to be too heavy to be pulled upward through capilarity action.

BRIEF DESCRIPTION OF THE DRAWINGS

Similar reference numerals refer to similar parts throughout the several views of the drawings.

DETAILED DESCRIPTION OF THE PREFERRED EMBODIMENT

Figure 1:
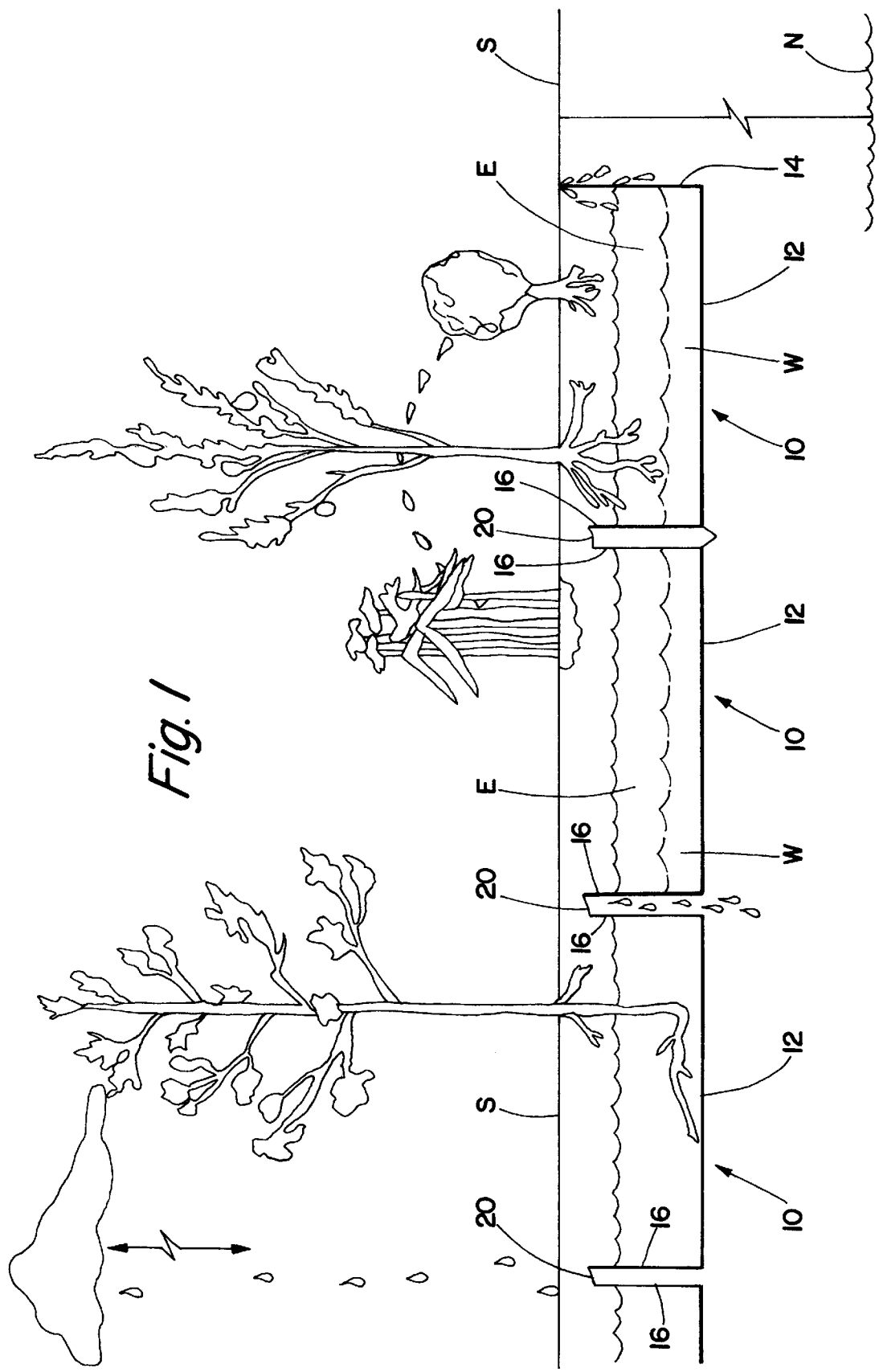
FIG. 1 is a cutaway side view of the artificial water system of the present invention.
Figure 2:
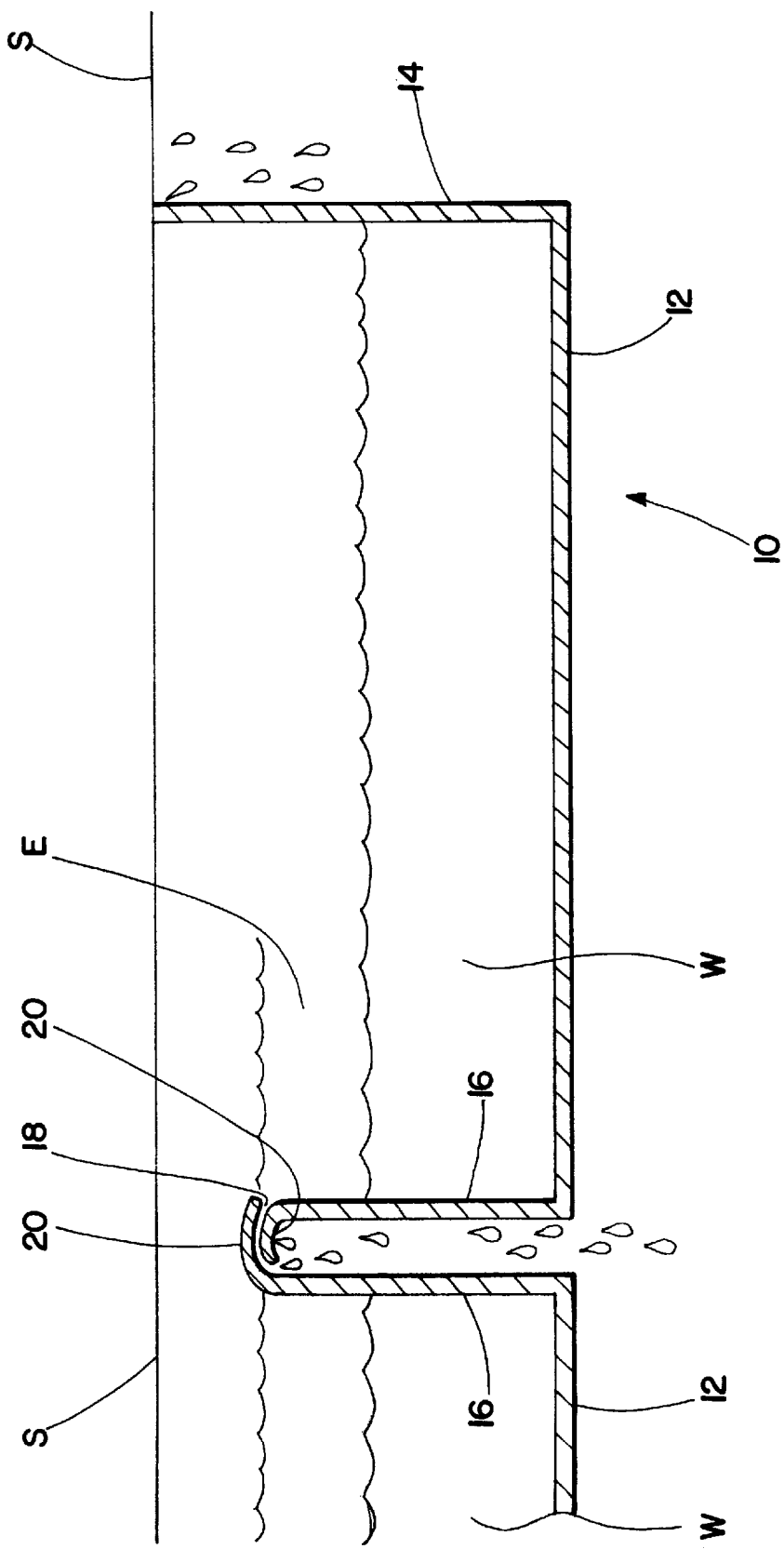
FIG. 2 is a closeup cutaway view of two beds overlapping.

Referring now to the drawings, it is seen that the artificial water cycle system of the present invention is comprised of one or more water table cells 10 or beds that are submerged below the surface S of the soil. Each bed 10, which can be of any appropriate geometric shape and which is made from a water impervious material, such as polyethylene, has a base member 12 that is disposed in generally horizontal orientation relative to the surface and has encompassing sidewalls oriented upwardly. The sidewalls 14 that form the outer periphery of the system terminate just below the surface S while internal sidewalls 16 terminate lower below the surface S relative to the peirphery sidewalls 14. The sidewalls 16 not at the outer periphery need to terminate below the surface, otherwise they would be damaged during plowing.

The sidewalls 16 of a given cell 10 that do not form the outer periphery of the system are slightly separated from an adjoining sidewall 16 and the end portions 20 overlap with the end portions 20 of an adjoining sidewall 16 of another cell 10. These end portions 20 are simply laid over one another and are not otherwise secured in any fashion, leaving a gap or opening 18 between the overlapping end portions 20.

The depth of each base member 12 is dependent on the specified water table level W desired which is dependent on the type of soil within which it is buried, the amount and frequency of the precipitation, and the type of crop or crops to be planted therein. It is also possible to position adjoining beds 10 at different depths relative to each other.

Any water introduced onto the soil's surface percolates downward until it reaches the base member 12 which prohibits further downward percolation. As a result, an artificial water table W is formed within the bed 10. Upon reaching the resting point of fully saturated soil, the cohesive force of capilarity act on and cause the water table W to release water and pull it, along with contained nutrients upward by mass action. As a result, the crop's roots have a continual supply of water and nutrition. Any introduced water, either natural and through irrigation, is maintained within the system and is utilized by the crops. This greatly reduces the amount of water introduction required via irrigation means, thereby reducing the costs of agricultural operations.

If excessive water E is introduced, such as through a flood, the excess water E, through capilarity action exits through the openings 18 existing between the overlapping end portions 20 of adjoining beds 10, and is channeled down toward the natural water table N and away from the system. As the outer periphery end portions 20 terminate prior to the ground surface S, capilarity allows the excess water E to be channeled over these end portions 20 and down toward the natural water table.

While the invention has been particularly shown and described with reference to an embodiment thereof, it will be appreciated by those skilled in the art that various changes in form and detail may be made without departing from the spirit and scope of the invention.

I claim:

1. An artificial water cycle system having a periphery and an interior, for use below the ground surface, comprising:
   a plurality of cells, disposed below the ground surface, each cell having a generally horizontally disposed base, at least one vertically and upwardly disposed sidewall, and an end portion, attached to each of the at least one sidewall, adapted to terminate just below the ground surface; and
   wherein each of the sidewalls that are located within the interior are disposed in spaced apart orientation to any adjoining each of the sidewalls and their end portions overlap the end portions of the adjoining sidewalls and their end portions are positioned farther from the ground surface relative to the end portions of the sidewalls located on the periphery.

2. The artificial water cycle system as in claim 1 wherein each of the plurality of cells is formed from a water impervious material.

\* \* \* \* \*